United States Patent
Uehara et al.

(10) Patent No.: US 9,688,797 B2
(45) Date of Patent: Jun. 27, 2017

(54) SURFACE TREATMENT AGENT

(71) Applicant: DAIKIN INDUSTRIES, LTD., Osaka-shi, Osaka (JP)

(72) Inventors: Tetsuya Uehara, Settsu (JP); Masahiro Miyahara, Settsu (JP); Masaki Fukumori, Settsu (JP); Kanako Fukumoto, Settsu (JP); Ikuo Yamamoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/901,334

(22) PCT Filed: Jun. 18, 2014

(86) PCT No.: PCT/JP2014/066184
§ 371 (c)(1),
(2) Date: Dec. 28, 2015

(87) PCT Pub. No.: WO2014/208424
PCT Pub. Date: Dec. 31, 2014

(65) Prior Publication Data
US 2016/0137765 A1 May 19, 2016

(30) Foreign Application Priority Data

Jun. 28, 2013 (JP) .............................. 2013-136867

(51) Int. Cl.
| | | |
|---|---|---|
| *C08F 18/20* | (2006.01) | |
| *C08F 216/14* | (2006.01) | |
| *C08F 220/22* | (2006.01) | |
| *C09D 183/10* | (2006.01) | |
| *C11D 7/30* | (2006.01) | |
| *D06M 15/277* | (2006.01) | |
| *D06M 15/356* | (2006.01) | |
| *C08G 77/14* | (2006.01) | |
| *C08G 77/20* | (2006.01) | |

(52) U.S. Cl.
CPC ...... *C08F 216/1408* (2013.01); *C08F 220/22* (2013.01); *C09D 183/10* (2013.01); *C11D 7/30* (2013.01); *D06M 15/277* (2013.01); *D06M 15/3568* (2013.01); *C08G 77/14* (2013.01); *C08G 77/20* (2013.01)

(58) Field of Classification Search
CPC ................ C08F 216/1408; C11D 7/30; D06M 15/3568; D06M 15/277

USPC ......................................................... 524/245
See application file for complete search history.

(56) References Cited

U.S. PATENT DOCUMENTS

| | | |
|---|---|---|
| 2006/0134439 A1 | 6/2006 | Yamamoto et al. |
| 2006/0205864 A1 | 9/2006 | Yamamoto et al. |
| 2009/0030143 A1 | 1/2009 | Yamamoto et al. |
| 2010/0227173 A1 | 9/2010 | Ueda et al. |
| 2011/0287678 A1* | 11/2011 | Minami .............. C08F 283/122 442/80 |

FOREIGN PATENT DOCUMENTS

| | | | |
|---|---|---|---|
| JP | 2003138018 A | * | 5/2003 |
| JP | 2007-254715 A | | 10/2007 |
| JP | 2007254715 A | * | 10/2007 |
| JP | 2011-201981 A | | 10/2011 |
| JP | 2011201981 A | * | 10/2011 |
| JP | 2012-503031 A | | 2/2012 |
| WO | 2004/096939 A1 | | 11/2004 |
| WO | 2004/108855 A1 | | 12/2004 |
| WO | 2006/121171 A1 | | 11/2006 |
| WO | 2008/143093 A1 | | 11/2008 |
| WO | 2010/030041 A1 | | 3/2010 |
| WO | 2010/030042 A1 | | 3/2010 |

OTHER PUBLICATIONS

Translation of JP 2003-138018, May 14, 2003.*
International Preliminary Report on Patentability dated Jan. 7, 2016 from the International Bureau in counterpart application No. PCT/JP2014/066184.
International Search Report for PCT/JP2014/066184 dated Sep. 30, 2014.
Communication dated Dec. 6, 2016, from the European Patent Office in counterpart European application No. 14817619.1.

* cited by examiner

*Primary Examiner* — Hui Chin
(74) *Attorney, Agent, or Firm* — Sughrue Mion, PLLC

(57) ABSTRACT

A fluorine-containing polymer having (a) a repeating unit derived from a fluorine-containing monomer indicated by the formula $CH_2=C(-X)-C(=O)-Y-Z-Rf$, (b) a repeating unit derived from a cyclic-hydrocarbon-group-containing acrylate ester monomer indicated by the formula $CH_2=CQ^{11}-C(=O)-O-Q^{12}$, and (c) a repeating unit derived from an aliphatic-hydrocarbon-group-containing acrylate ester monomer indicated by the formula $CH_2=CQ^{21}-C(=O)-O-Q^{22}$. The fluorine-containing polymer is produced by polymerizing in the presence of one or both of (d) a silicon-containing monomer and a silicon-containing chain transfer agent.

11 Claims, No Drawings

SURFACE TREATMENT AGENT

CROSS REFERENCE TO RELATED APPLICATIONS

This application is a National Stage of International Application No. PCT/JP2014/066184 filed Jun. 18, 2014, claiming priority based on Japanese Patent Application No. 2013-136867 filed Jun. 28, 2013, the contents of all of which are incorporated herein by reference in their entirety.

TECHNICAL FIELD

The present invention relates to a surface treatment agent, particularly a water- and oil-repellent agent, and a fluorine-containing polymer which is an active ingredient of the surface treatment agent.

BACKGROUND ART

In a factory which conducting the dry-cleaning of clothing etc., a petroleum solvent, a chlorine-based solvent, a fluorine-based solvent, etc. are used as a dry-cleaning solvent. Among these, safety of the chlorine-based solvent is regarded as questionable although the chlorine-based solvent has an advantage which washing and drying can conducted in a short time, and the fluorine-based solvent is expensive although the fluorine-based solvent has the advantage of nonflammability. Accordingly the petroleum solvent is increasingly widely used. Water- and oil-repelling treatment of clothing etc. can be conducted by using the same device and process as the dry cleaning. Therefore, it is desired that the water- and oil-repellent agent used for water- and oil-repelling treatment comprises the petroleum solvent as the solvent, or has easy dilution and dispersion into the petroleum solvent.

Hitherto, various fluorine-containing compounds are proposed. The fluorine-containing compounds have the advantageous effects of having properties excellent in heat resistance, oxidation resistance, weather resistance and the like. The fluorine-containing compounds are used as, for example, the water- and oil-repellent agent and soil release agent by utilizing the properties that the fluorine-containing compounds have low free energy, i.e., difficulty in adherence.

Examples of the fluorine-containing compounds used as the water- and oil-repellent agent include a fluorine-containing polymer having repeating units derived from (meth) acrylate ester having a fluoroalkyl group. Various up-to-date research results indicate that, in view of the practical treatment of fibers with the surface treatment agent, the important surface property is not a static contact angle, but is a dynamic contact angle, particularly a reversing contact angle. That is, the advancing contact angle of water is not dependent on the carbon number of the fluoroalkyl side chain, but the reversing contact angle of water in the case of carbon number of at most 7 is remarkably low than that in the case of carbon number of at least 8. In correspondence to this, an X ray analysis shows that the side chain crystallizes when the carbon number of side chain is at least 7. It is known that the actual water repellency has correlation with the crystallization of the side chain and that mobility of the surface treatment agent molecules is an important factor for expression of the actual performances (for example, MAEKAWA Takashige, FINE CHEMICAL, Vol. 23, No. 6, page 12 (1994)). On basis of the above-mentioned reasons, the acrylate polymer as such having low carbon number of fluoroalkyl group in the side chain which is at most 7 (particularly at most 6) has low crystallinity so that the polymer cannot satisfy the practical performances.

WO2004/096939 A1 discloses a surface treatment agent which comprises a fluorine-containing polymer formed from a fluorine-containing monomer, a monomer free from a fluorine atom, and an optionally present crosslikable monomer.

WO2008/143093 A1 discloses a masonry treatment agent which comprises a fluorine-containing polymer formed from a fluorine-containing acrylate monomer, and one or both of a monomer having a cyclic hydrocarbon group or a monomer having a short chain hydrocarbon group.

WO2006/121171 A1 discloses a surface treatment agent which comprises a fluorosilicone reaction product which comprises a mercapto-functional organopolysiloxane and a fluorine-containing monomer.

WO2004/108855 A1 discloses a surface treatment agent which comprises a fluorine-containing polymer formed from a fluorine-containing monomer, wherein (a) the fluorine-containing polymer has a silicon atom, or (b) the surface treatment agent comprises the fluorine-containing polymer (first polymer), and a second polymer that is different from the first polymer and that is a silicon-containing polymer having a silicon atom.

The treatment agents proposed by these prior art literatures would not give both of the excellent solubility (of the fluorine-containing polymer) to the petroleum solvent, and the excellent water- and oil-repellency.

The surface treatment agents, which are now industrially used and which are a solution in an organic solvent, are supposed to comprise 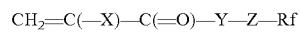 $F(CF_2)_6CH_2CH_2OCOC(CH_3)=CH_2$ (C6SFMA), isobornyl methacrylate and stearyl methacrylate.

PRIOR ARTS DOCUMENTS

Patent Documents

Patent document 1: WO2004/096939 A1
Patent document 2: WO2008/143093 A1
Patent document 3: WO2006/121171 A1
Patent document 4: WO2004/108855 A1

DISCLOSURE OF INVENTION

Problems to be Solved by the Invention

An object of the present invention is to provide a surface treatment agent which is excellent in the solubility of a fluorine-containing polymer in a surface treatment agent, and excellent in water- and oil-repellency.

Means for Solving the Problems

The present invention provides a fluorine-containing polymer comprising:
(a) repeating units derived from a fluorine-containing monomer represented by the formula:

$$CH_2=C(-X)-C(=O)-Y-Z-Rf$$

wherein X is a hydrogen atom, a monovalent organic group or a halogen atom,
Y is $-O-$ or $-NH-$,
Z is a direct bond or an divalent organic group, and
Rf is a fluoroalkyl group having 1 to 20 carbon atoms, (b) repeating units derived from a cyclic hydrocarbon group-containing acrylate ester monomer represented by the formula:

$$CH_2=CQ^{11}-C(=O)-O-Q^{12}$$

wherein $Q^{11}$ is a hydrogen atom, a monovalent organic group or a halogen atom, and
$Q^{12}$ is a cyclic hydrocarbon-containing group having 4 to 30 carbon atoms, and (c) repeating units derived from an aliphatic hydrocarbon group-containing acrylate ester monomer represented by the formula:

$$CH_2=CQ^{21}-C(=O)-O-Q^{22}$$

wherein $Q^{21}$ is a hydrogen atom, a monovalent organic group or a halogen atom, and
$Q^{22}$ is a linear or branched aliphatic hydrocarbon group having 8 to 30 carbon atoms,
wherein the fluorine-containing polymer is produced by polymerization in the presence of:
(d) one or both of a silicon-containing monomer or a silicon-containing chain transfer agent.

The present invention also provides a surface treatment agent comprising (1) the above-mentioned fluorine-containing polymer and (2) a liquid medium.

Effects of the Invention

The surface treatment agent of the present invention can give the excellent solubility of the fluorine-containing polymer into the surface treatment agent, and can give the excellent water- and oil-repellency excellent to a substrate. The surface treatment agent of the present invention can give both of the excellent solubility and the excellent water- and oil-repellency. Excellent stain proofness is also given. Durability of water- and oil-repellency and stain proofness are also excellent.

The copolymerizability of the fluorine-containing polymer of the present invention is good.

MODES FOR CARRYING OUT THE INVENTION

In the present invention, the fluorine-containing polymer (or the fluorine-containing copolymer) has:
(a) repeating units derived from the fluorine-containing monomer,
(b) repeating units derived from the cyclic hydrocarbon group-containing monomer,
(c) repeating units derived from the linear or branched hydrocarbon group-containing monomer, and optionally
(d) repeating units derived from the silicon-containing monomer.
(a) Fluorine-containing Monomer The fluorine-containing monomer (a) is represented by the general formula:

$$CH_2=C(-X)-C(=O)-Y-Z-Rf \quad (I)$$

wherein X is a hydrogen atom, a monovalent organic group or a halogen atom,
Y is —O— or —NH—,
Z is a direct bond or an divalent organic group, and
Rf is a fluoroalkyl group having 1 to 20 carbon atoms.

Z may be, for example, a linear alkylene group or branched alkylene group having 1 to 20 carbon atoms, such as a group represented by the formula —$(CH_2)_x$— wherein x is from 1 to 10 or a group represented by the formula —$SO_2N(R^1)R^2$— or the formula —$CON(R^1)R^2$— wherein $R^1$ is an alkyl group having 1 to 10 carbon atoms and $R^2$ is a linear alkylene group or branched alkylene group having 1 to 10 carbon atoms or a group represented by the formula —$CH_2CH(OR^3)CH_2$— wherein $R^3$ is a hydrogen atom or an acyl group having 1 to 10 carbon atoms (for example, formyl group or acetyl group) or a group represented by the formula —Ar—$CH_2$— wherein Ar is an arylene group optionally having a substituent group, or a —$(CH_2)_m$—$SO_2$—$(CH_2)_n$— group or —$(CH_2)_m$—S—$(CH_2)_n$— group wherein m is 1-10 and n is 0-10. Specific examples of X are H, $CH_3$, Cl, Br, I, F, CN and $CF_3$. X is preferably a methyl group or a chlorine atom, and particularly a chlorine atom.

The fluorine-containing monomer (A) is preferably an acrylate ester or acrylamide represented by the formula:

$$CH_2=C(-X)-C(=O)-Y-Z-Rf \quad (I)$$

wherein
X is a hydrogen atom, a linear or branched alkyl group having 1 to 21 carbon atoms, a fluorine atom, a chlorine atom, a bromine atom, an iodine atom, a $CFX^1X^2$ group (where each of $X^1$ and $X^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group;
Y is —O— or —NH— group;
Z is an aliphatic group having 1 to 10 carbon atoms, an aromatic or cycloaliphatic group having 6 to 18 carbon atoms, a —$CH_2CH_2N(R^1)SO_2$— group (wherein $R^1$ is an alkyl group having 1 to 4 carbon atoms), a —$CH_2CH(OZ^1)CH_2$— group (wherein $Z^1$ is a hydrogen atom or an acetyl group), a —$(CH_2)_m$—$SO_2$—$(CH_2)_n$— group or a —$(CH_2)_m$—S—$(CH_2)_n$— group (wherein m is 1 to 10 and n is 0 to 10),
Rf is a linear or branched fluoroalkyl group having 1 to 20 carbon atoms.

In the formula (I), the Rf group is preferably a perfluoroalkyl group. The carbon number of the Rf group is preferably from 1 to 20, for example, 1 to 6, particularly from 4 to 6, especially 6. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$, —$(CF_2)_4CF(CF_3)_2$ and —$C_8F_{17}$.

Z is preferably an aliphatic group having 1 to 10 carbon atoms, an aromatic or cycloaliphatic group having 6 to 18 carbon atoms, —$CH_2CH_2N(R^1)SO_2$— group (wherein $R^1$ is an alkyl group having 1 to 4 carbon atoms) or —$CH_2CH(OZ^1)CH_2$— group (wherein $Z^1$ is a hydrogen atom or an acetyl group) or —$(CH_2)_m$—$SO_2$—$(CH_2)_n$— group or —$(CH_2)_m$—S—$(CH_2)_n$— group (wherein m is 1 to 10, n is 0 to 10). The aliphatic group is preferably an alkylene group (having particularly 1 to 4, for example, 1 or 2 carbon atoms). The aromatic group or the cyclic aliphatic group may be substituted or unsubstituted. The S group or the $SO_2$ group may directly bond to the Rf group.

Specific examples of the fluorine-containing monomer (a) include, but are not limited to, the following:
$CH_2=C(-Cl)-C(=O)-O-(CH_2)_2-Rf$
$CH_2=C(-Cl)-C(=O)-O-C_6H_4-Rf$
$CH_2=C(-Cl)-C(=O)-O-(CH_2)_4-Rf$
$CH_2=C(-Cl)-C(=O)-O-(CH_2)_2N(-CH_3)SO_2-Rf$ CH$_2$=C(—Cl)—C(=O)—O—(CH$_2$)$_2$N(—C$_2$H$_5$)SO$_2$—Rf
CH$_2$=C(—Cl)—C(=O)—O—CH$_2$CH(—OH)CH$_2$—Rf
CH$_2$=C(—Cl)—C(=O)—O—CH$_2$CH(—OCOCH$_3$)CH$_2$—Rf
CH$_2$=C(—Cl)—C(=O)—O—(CH$_2$)$_2$—S—Rf
CH$_2$=C(—Cl)—C(=O)—O—(CH$_2$)$_2$—S—(CH$_2$)$_2$—Rf
CH$_2$=C(—Cl)—C(=O)—O—(CH$_2$)$_3$—SO$_2$—Rf
CH$_2$=C(—Cl)—C(=O)—O—(CH$_2$)$_2$—SO$_2$—(CH$_2$)$_2$—Rf
CH$_2$=C(—Cl)—C(=O)—NH—(CH$_2$)$_2$—Rf
CH$_2$=C(—H)—C(=O)—O—(CH$_2$)$_2$—Rf
CH$_2$=C(—H)—C(=O)—O—C$_6$H$_4$—Rf
CH$_2$=C(—H)—C(=O)—O—(CH$_2$)$_4$—Rf
CH$_2$=C(—H)—C(=O)—O—(CH$_2$)$_2$N(—CH$_3$)SO$_2$—Rf
CH$_2$=C(—H)—C(=O)—O—(CH$_2$)$_2$N(—C$_2$H$_5$)SO$_2$—Rf
CH$_2$=C(—H)—C(=O)—O—CH$_2$CH(—OH)CH$_2$—Rf
CH$_2$=C(—H)—C(=O)—O—CH$_2$CH(—OCOCH$_3$)CH$_2$—Rf
CH$_2$=C(—H)—C(=O)—O—(CH$_2$)$_2$—S—Rf
CH$_2$=C(—H)—C(=O)—O—(CH$_2$)$_2$—S—(CH$_2$)$_2$—Rf
CH$_2$=C(—H)—C(=O)—O—(CH$_2$)$_3$—SO$_2$—Rf
CH$_2$=C(—H)—C(=O)—O—(CH$_2$)$_2$—SO$_2$—(CH$_2$)$_2$—Rf
CH$_2$=C(—H)—C(=O)—NH—(CH$_2$)$_2$—Rf
CH$_2$=C(—CH$_3$)—C(=O)—O—(CH$_2$)$_2$—Rf
CH$_2$=C(—CH$_3$)—C(=O)—O—C$_6$H$_4$—Rf
CH$_2$=C(—CH$_3$)—C(=O)—O—(CH$_2$)$_4$—Rf
CH$_2$=C(—CH$_3$)—C(=O)—O—(CH$_2$)$_2$N(—CH$_3$)SO$_2$—Rf
CH$_2$=C(—CH$_3$)—C(=O)—O—(CH$_2$)$_2$N(—C$_2$H$_5$)SO$_2$—Rf
CH$_2$=C(—CH$_3$)—C(=O)—O—CH$_2$CH(—OH)CH$_2$—Rf
CH$_2$=C(—CH$_3$)—C(=O)—O—CH$_2$CH(—OCOCH$_3$)CH$_2$—Rf
CH$_2$=C(—CH$_3$)—C(=O)—O—(CH$_2$)$_2$—S—Rf
CH$_2$=C(—CH$_3$)—C(=O)—O—(CH$_2$)$_2$—S—(CH$_2$)$_2$—Rf
CH$_2$=C(—CH$_3$)—C(=O)—O—(CH$_2$)$_3$—SO$_2$—Rf
CH$_2$=C, (—CH$_3$)—C(=O)—O—(CH$_2$)$_2$—SO$_2$—(CH$_2$)$_2$—Rf
CH$_2$=C(—CH$_3$)—C(=O)—NH—(CH$_2$)$_2$—Rf
CH$_2$=C(—F)—C(=O)—O—(CH$_2$)$_2$—S—Rf
CH$_2$=C(—F)—C(=O)—O—(CH$_2$)$_2$—S—(CH$_2$)$_2$—Rf
CH$_2$=C(—F)—C(=O)—O—(CH$_2$)$_2$—SO$_2$—Rf
CH$_2$=C(—F)—C(=O)—O—(CH$_2$)$_2$—SO$_2$—(CH$_2$)$_2$—Rf
CH$_2$=C(—F)—C(=O)—NH—(CH$_2$)$_2$—Rf
CH$_2$=C(—Cl)—C(=O)—O—(CH$_2$)$_2$—S—Rf
CH$_2$=C(—Cl)—C(=O)—O—(CH$_2$)$_2$—S—(CH$_2$)$_2$—Rf
CH$_2$=C(—Cl)—C(=O)—O—(CH$_2$)$_2$—SO$_2$—Rf
CH$_2$=C(—Cl)—C(=O)—O—(CH$_2$)$_2$—SO$_2$—(CH$_2$)$_2$—Rf
CH$_2$=C(—Cl)—C(=O)—NH—(CH$_2$)$_2$—Rf
CH$_2$=C(—CF$_3$)—C(=O)—O—(CH$_2$)$_2$—S—Rf
CH$_2$=C(—CF$_3$)—C(=O)—O—(CH$_2$)$_2$—S—(CH$_2$)$_2$—Rf
CH$_2$=C(—CF$_3$)—C(=O)—O—(CH$_2$)$_2$—SO$_2$—Rf
CH$_2$=C, (—CF$_3$)—C(=O)—O—(CH$_2$)$_2$—SO$_2$—(CH$_2$)$_2$—Rf
CH$_2$=C(—CF$_3$)—C(=O)—NH—(CH$_2$)$_2$—Rf
CH$_2$=C(—CF$_2$H)—C(=O)—O—(CH$_2$)$_2$—S—Rf
CH$_2$=C(—CF$_2$H)—C(=O)—O—(CH$_2$)$_2$—S—(CH$_2$)$_2$—Rf
CH$_2$=C(—CF$_2$H)—C(=O)—O—(CH$_2$)$_2$—SO$_2$—Rf
CH$_2$=C, (—CF$_2$H)—C(=O)—O—(CH$_2$)$_2$—SO$_2$—(CH$_2$)$_2$—Rf
CH$_2$=C(—CF$_2$H)—C(=O)—NH—(CH$_2$)$_2$—Rf
CH$_2$=C(—CN)—C(=O)—O—(CH$_2$)$_2$—S—Rf
CH$_2$=C(—CN)—C(=O)—O—(CH$_2$)$_2$—S—(CH$_2$)$_2$—Rf
CH$_2$=C(—CN)—C(=O)—O—(CH$_2$)$_2$—SO$_2$—Rf
CH$_2$=C(—CN)—C(=O)—O—(CH$_2$)$_2$—SO$_2$—(CH$_2$)$_2$—Rf
CH$_2$=C(—CN)—C(=O)—NH—(CH$_2$)$_2$—Rf
CH$_2$=C(—CF$_2$CF$_3$)—C(=O)—O—(CH$_2$)$_2$—S—Rf
CH$_2$=C, (—CF$_2$CF$_3$)—C(=O)—O—(CH$_2$)$_2$—S—(CH$_2$)$_2$—Rf
CH$_2$=C(—CF$_2$CF$_3$)—C(=O)—O—(CH$_2$)$_2$—SO$_2$—Rf
CH$_2$=C, (—CF$_2$CF$_3$)—C(=O)—O—(CH$_2$)$_2$—SO$_2$—(CH$_2$)$_2$—Rf
CH$_2$=C(—CF$_2$CF$_3$)—C(=O)—NH—(CH$_2$)$_2$—Rf
CH$_2$=C(—F)—C(=O)—O—(CH$_2$)$_3$—S—Rf
CH$_2$=C(—F)—C(=O)—O—(CH$_2$)$_3$—S—(CH$_2$)$_2$—Rf
CH$_2$=C(—F)—C(=O)—O—(CH$_2$)$_3$—SO$_2$—Rf
CH$_2$=C(—F)—C(=O)—O—(CH$_2$)$_3$—SO$_2$—(CH$_2$)$_2$—Rf
CH$_2$=C(—F)—C(=O)—NH—(CH$_2$)$_3$—Rf
CH$_2$=C(—Cl)—C(=O)—O—(CH$_2$)$_3$—S—Rf
CH$_2$=C(—Cl)—C(=O)—O—(CH$_2$)$_3$—S—(CH$_2$)$_2$—Rf
CH$_2$=C(—Cl)—C(=O)—O—(CH$_2$)$_3$—SO$_2$—Rf
CH$_2$=C(—Cl)—C(=O)—O—(CH$_2$)$_3$—SO$_2$—(CH$_2$)$_2$—Rf
CH$_2$=C(—CF$_3$)—C(=O)—O—(CH$_2$)$_3$—S—Rf
CH$_2$=C(—CF$_3$)—C(=O)—O—(CH$_2$)$_3$—S—(CH$_2$)$_2$—Rf
CH$_2$=C(—CF$_3$)—C(=O)—O—(CH$_2$)$_3$—SO$_2$—Rf
CH$_2$=C, (—CF$_3$)—C(=O)—O—(CH$_2$)$_3$—SO$_2$—(CH$_2$)$_2$—Rf
CH$_2$=C(—CF$_2$H)—C(=O)—O—(CH$_2$)$_3$—S—Rf
CH$_2$=C(—CF$_2$H)—C(=O)—O—(CH$_2$)$_3$—S—(CH$_2$)$_2$—Rf
CH$_2$=C(—CF$_2$H)—C(=O)—O—(CH$_2$)$_3$—SO$_2$—Rf
CH$_2$=C, (—CF$_2$H)—C(=O)—O—(CH$_2$)$_3$—SO$_2$—(CH$_2$)$_2$—Rf
CH$_2$=C(—CN)—C(=O)—O—(CH$_2$)$_3$—S—Rf
CH$_2$=C(—CN)—C(=O)—O—(CH$_2$)$_3$—S—(CH$_2$)$_2$—Rf
CH$_2$=C(—CN)—C(=O)—O—(CH$_2$)$_3$—SO$_2$—Rf
CH$_2$=C(—CN)—C(=O)—O—(CH$_2$)$_3$—SO$_2$—(CH$_2$)$_2$—Rf
CH$_2$=C(—CF$_2$CF$_3$)—C(=O)—O—(CH$_2$)$_3$—S—Rf
CH$_2$=C, (—CF$_2$CF$_3$)—C(=O)—O—(CH$_2$)$_3$—S—(CH$_2$)$_2$—Rf
CH$_2$=C(—CF$_2$CF$_3$)—C(=O)—O—(CH$_2$)$_3$—SO$_2$—Rf
CH$_2$=C, (—CF$_2$CF$_3$)—C(=O)—O—(CH$_2$)$_2$—SO$_2$—(CH$_2$)$_2$—Rf wherein Rf is a fluoroalkyl group having 1 to 20 carbon atoms.

(b) Monomer having a Cyclic Hydrocarbon Group

The cyclic hydrocarbon group-containing acrylate ester monomer (b) is represented by the formula:

$$CH_2=CQ^{11}—C(=O)—O-Q^{12}$$

wherein $Q^{11}$ is a hydrogen atom, a monovalent organic group or a halogen atom, and
$Q^{12}$ is a cyclic hydrocarbon-containing group having 4 to 30 carbon atoms.

The cyclic hydrocarbon group-containing acrylate ester monomer (b) does not have a fluoroalkyl group. Although the cyclic hydrocarbon group-containing acrylate ester monomer (b) may contain a fluorine atom, preferably does not contain the fluorine atom.

Preferably, $Q^{11}$ is a hydrogen atom, an alkyl group having 1 to 10 carbon atom, or a halogen atom. Particularly preferably, $Q^{11}$ is a methyl group.

$Q^{12}$ is the cyclic hydrocarbon group which may have a chain group (for example, a linear or branched hydrocarbon group). Examples of the cyclic hydrocarbon group include a saturated or unsaturated, monocyclic group, polycyclic group or bridged ring group. The cyclic hydrocarbon group is preferably unsaturated. The cyclic hydrocarbon group preferably has from 4 to 30, more preferably from 6 to 20 carbon atoms. Examples of the cyclic hydrocarbon group include a cycloaliphatic group having 4 to 20 carbon atoms, particularly 5 to 12 carbon atoms, an aromatic group having 6 to 20 carbon atoms, and an araliphatic group having 7 to 20 carbon atoms. The number of carbon atoms in the cyclic hydrocarbon group is particularly preferably at most 15, for example, at most 12. The cyclic hydrocarbon group is preferably an unsaturated cycloaliphatic group. Specific examples of the preferable cyclic hydrocarbon group include a cyclohexyl group, a t-butyl cyclohexyl group, a benzyl group, an isobornyl group, a dicyclopentanyl group and a dicyclopentenyl group.

Specific examples of the cyclic hydrocarbon group-containing acrylate ester monomer include:
cyclohexyl acrylate, t-butylcyclohexyl acrylate, benzyl acrylate, isobornyl acrylate, dicyclopentanyl acrylate, dicyclopentenyl acrylate, cyclohexyl methacrylate, t-butylcyclohexyl methacrylate, benzyl methacrylate, isobornyl methacrylate, dicyclopentanyl methacrylate and dicyclopentenyl methacrylate.

The presence of the cyclic hydrocarbon group-containing acrylate ester monomer can increase the water repellency and oil repellency given by the fluorine-containing polymer.

(c) Monomer having a Linear or Branched Hydrocarbon Group

The aliphatic hydrocarbon group-containing acrylate ester monomer (c) is represented by the formula:

$$CH_2=CQ^{21}-C(=O)-O-Q^{22}$$

wherein $Q^{21}$ is a hydrogen atom, a monovalent organic group or a halogen atom, and
$Q^{22}$ is a linear or branched aliphatic hydrocarbon group having 8 to 30 carbon atoms, The linear or branched hydrocarbon group-containing monomer (c) does not have a fluoroalkyl group. Although the linear or branched hydrocarbon group-containing monomer (c) may contain a fluorine atom, it is preferred not to contain a fluorine atom.

$Q^{21}$ is preferably a hydrogen atom, an alkyl group having 1 to 10 carbon atoms or a halogen atom. Particularly preferably, $Q^{21}$ is a methyl group.

$Q^{22}$ is a linear or branched hydrocarbon group. Particularly, the linear or branched hydrocarbon group may be a linear hydrocarbon group. Preferably, the linear or branched hydrocarbon group has 8-30, for example, 12-28, particularly 18-26 carbon atoms. Preferably, the linear or branched hydrocarbon groups is generally a saturated aliphatic hydrocarbon group, particularly an alkyl group.

The monomer (c) may be a (meth)acrylate ester having an alkyl group, particularly an alkyl (meth)acrylate ester. The number of the carbon atoms in the alkyl group may be from 8 to 30, for example, from 12 to 28, particularly 18 to 26. For example, the monomer having a linear or branched hydrocarbon group is an acrylate represented by the formula:

$$CH_2=CA^1COOA^2$$

wherein $A^1$ is a hydrogen atom, a methyl group or a halogen atom other than a fluorine atom (for example, a chlorine atom, a bromine atom, and an iodine atom),
$A^2$ is an alkyl group expressed by $C_nH_{2n+1}$ (n=8-30, particularly 12-28).

Particularly preferable examples of the monomer (c) are lauryl (meth)acrylate, cetyl (meth)acrylate, stearyl (meth)acrylate and behenyl (meth)acrylate.

The presence of the linear or branched hydrocarbon group-containing monomer can increase the solubility of the fluorine-containing polymer and can increase the water repellency and oil repellency given by the fluorine-containing polymer.

Preferably, one of both of the monomers (b) and (c) is a methacrylate ester wherein $Q^{11}$ and $Q^{21}$ are a methyl group, since the water- and oil-repellency is high. Particularly, both of the monomers (b) and (c) are preferably a methacrylate ester.

(d) Silicon-containing Monomer or Chain Transfer Agent

In the present invention, a silicon-containing compound is used as a monomer or a chain transfer agent. One or both of the silicon-containing monomer and the silicon-containing chain transfer agent is used.

Examples of the silicon-containing monomer include a monomer having a silane group. Preferably, the monomer having a silane group is a compound having a silane group (particularly, an end silane group(s)) and a olefinic carbon-carbon double bond (particularly, a (meth)acrylate group or a vinyl group). The monomer having a silane group may be a monomer having a silane coupling end group, or a silane coupling side chain group.

The silicon-containing monomer may be a monomer having one (meth)acrylate group or vinyl group, and one silane group. Preferably, one (meth)acrylate group or vinyl group is bonded to one silane group through a direct bond, an alkylene group having 1-10 carbon atoms or a (divalent) bond group such as a siloxane group. In the case of the (meth)acrylate group, the bond groups is preferably a $C_{1-10}$ alkylene group or a siloxane group. In the case of the vinyl group, the bond group is preferably a direct bond.

When using the silicon-containing monomer, (e) an amino group-containing monomer or a carboxylic acid group-containing monomer is more preferably used simultaneously (Particularly, when a substrate to be treated is a textile comprising cotton).

Examples of the silane group-containing monomer include the followings:
$CH_2=CHCO_2(CH_2)_3Si(OCH_3)_3$,
$CH_2=CHCO_2(CH_2)_3Si(OC_2H_5)_3$,
$CH_2=C(CH_3)CO_2(CH_2)_3Si(OCH_3)_3$
(γ-Methacryloxypropyl trimethoxy silane),
$CH_2=C(CH_3)CO_2(CH_2)_3Si(OC_2H_5)_3$,
$CH_2=CHCO_2(CH_2)_3SiCH_3(OC_2H_5)_2$,
$CH_2=C(CH_3)CO_2(CH_2)_3SiC_2H_5(OCH_3)_2$,
$CH_2=C(CH_3)CO_2(CH_2)_3Si(CH_3)_2(OC_2H_5)$,
$CH_2=C(CH_3)CO_2(CH_2)_3Si(CH_3)_2OH$,
$CH_2=CHCO_2(CH_2)_3SiCH_3[ON(CH_3)C_2H_5]_2$,
$CH_2=C(CH_3)CO_2(CH_2)_3SiC_6H_5[ON(CH_3)C_2H_5]_2$,
$CH_2=C(CH_3)CO_2(CH_2)_3Si(CH_3)_2[OSi(CH_3)_2]_nOSi(CH_3)_2C_4H_9$,
$CH_2=CHSi(OCH_3)_3$,
$CH_2=CHSi(OC_2H_5)_3$,
$CH_2=CHSiCH_3(OCH_3)_2$, $CH_2=CHSi(CH_3)_2(OC_2H_5)$,
$CH_2=CHSi(CH_3)_2SiCH_3(OCH_3)_2$,
$CH_2=CHSiCH_3[ON(CH_3)C_2H_5]_2$,
Vinyltrichlorosilane, and
Vinyltris(2-methoxyethoxy)silane.

The silicon-containing compound can be used as a chain transfer agent. The silicon-containing chain transfer agent may be a mercapto-functional organopolysiloxane. The fluorine-containing polymer having a siloxane group is obtained by polymerizing monomers in the presence of the silicon-containing chain transfer agent. In one embodiment, the mercapto-functional organopolysiloxane has siloxy units having the following average formula:

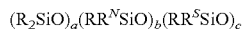

$(R_2SiO)_a(RR^NSiO)_b(RR^SSiO)_c$ wherein a is 0-4000, alternatively 0-1000, alternatively 0-400,
b is 1-1000, alternatively 1-100, alternatively 1-50,
c is 1-1000, alternatively 1-100, alternatively 1-50;
R is independently a monovalent organic group,
alternatively R is a hydrocarbon containing 1-30 carbon atoms,
alternatively R is a monovalent alkyl group containing 1-12 carbons,
alternatively R is a methyl group;
$R^N$ is a monovalent amino-functional organic group, and
$R^S$ is a monovalent mercapto-functional organic group.

Examples of the monovalent amino-functional organic group $R^N$ which is an organic functional group include the formula: $-R^1NHR^2$, the formula: $-R^1NR^2_2$ and the formula: $-R^1NHR^1NHR^2$ wherein each $R^1$ is independently a divalent hydrocarbon group having 2 or more carbon atoms, and $R^2$ is hydrogen or an alkyl group having 1-20 carbon atoms. Typically, each $R^1$ is an alkylene group having 2-20 carbon atoms.

Some suitable examples of the amino-functional hydrocarbon group include:
$-CH_2CH_2NH_2$, $-CH_2CH_2CH_2NH_2$,
$-CH_2CHCH_3NH_2$, $-CH_2CH_2CH_2CH_2NH_2$,
$-CH_2CH_2CH_2CH_2CH_2NH_2$,
$-CH_2CH_2CH_2CH_2CH_2CH_2NH_2$,
$-CH_2CH_2NHCH_3$, $-CH_2CH_2CH_2NHCH_3$,
$-CH_2(CH_3)CHCH_2NHCH_3$, $-CH_2CH_2CH_2CH_2NHCH_3$,
$-CH_2CH_2NCH_2CH_2NH_2$,
$-CH_2CH_2CH_2NHCH_2CH_2NH_2$,
$-CH_2CH_2CH_2CH_2NHCH_2CH_2CH_2NH_2$,
$-CH_2CH_2NHCH_2CH_2NHCH_3$,
$-CH_2CH_2CH_2NHCH_2CH_2CH_2NHCH_3$,
$-CH_2CH_2CH_2CH_2NHCH_2CH_2CH_2CH_2NHCH_3$ and
$-CH_2CH_2NHCH_2CH_2NHCH_2CH_2CH_3$. Typically, the amino-functional group is $-CH_2CH_2CH_2NH_2$.

Examples of $R^S$ include a group represented by the formula: $-R^1SR^2$ wherein each $R^1$ is independently a divalent hydrocarbon group having two or more carbon atoms, and $R^2$ is hydrogen or an alkyl group having 1-20 carbon atoms, and each of $R^1$ and $R^2$ is defined as above. Typically, each $R^1$ is an alkylene group having 2-20 carbon atoms. Examples of the mercapto-functional group include the following formulas:
$-CH_2CH_2CH_2SH$, $-CH_2CHCH_3SH$,
$-CH_2CH_2CH_2CH_2SH$,
$-CH_2CH_2CH_2CH_2CH_2SH$,
$-CH_2CH_2CH_2CH_2CH_2CH_2SH$, and
$-CH_2CH_2SCH_3$. Typically, the mercapto-functional group is $-CH_2CH_2CH_2SH$.

When one or both the silicon-containing monomer and silicon-containing chain transfer agent is present, the solubility of the fluorine-containing polymer is high.

(e) Amino Group-containing Monomer or Carboxylic Acid Group-containing Monomer

One or both of (e) an amino group-containing monomer and a carboxylic acid group-containing may be used as the monomer.

Examples of the amino group-containing monomer include one represented by the formula:

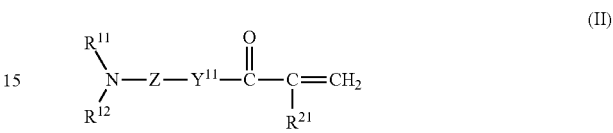

(II)

wherein $R^{11}$, $R^{12}$ and $R^{21}$ are, the same or different, a hydrogen atom or an alkyl group having 1-4 carbon atoms,
$Y^{11}$ is an oxygen atom or NH,
Z is a linear or branched alkylene group having 1-10 carbon atoms, and
$R^{11}$ and $R^{12}$ may be bonded each other to form a ring together with an adjacent nitrogen atom.

Since the polymer contains an amino group, when forming a salt, for example with a proton acid, and the polymer is dissolved in water, the polymer dissociates to present cationicity.

$R^{11}$, $R^{12}$ and $R^{21}$ are a hydrogen atom, or an alkyl group having 1-4 carbon atoms (for example, methyl, ethyl, propyl and butyl), respectively. $R^{21}$ is preferably a hydrogen atom or a methyl group. When $R^{11}$ and $R^{12}$ are bonded together to form a ring together with the adjacent nitrogen atom, $R^{11}$ and $R^{12}$ may be bonded together via a hetero atom, such as a nitrogen atom, an oxygen atom and a sulfur atom. Examples of the ring formed by $R^{11}$ and $R^{12}$ bonded together with the adjacent nitrogen atom include an aziridine ring, a pyrrolidine ring, a piperidine ring, a piperazine ring, and a morpholine ring.

Examples of the alkylene group which is Z include a linear or branched alkylene group having 1-21 carbon atoms (preferably 1-4 carbon atoms) such as methylene, ethylene, propylene, trimethylene, tetramethylene, and hexamethylene groups.

Examples of the amino group-containing monomer include
compounds where $Y^{11}$ is the oxygen atom in the chemical formula (II), such as dimethylaminoethyl (meth)acrylate, diethylaminoethyl (meth)acrylate, dimethylaminopropyl (meth)acrylate and diethylaminopropyl (meth)acrylate;
compounds where $Y^{11}$ is NH the oxygen atom in the chemical formula (II), such as dimethylaminoethyl (meth) acrylamide and dimethylaminopropyl (meth)acrylamide.

Since water- and oil-repellency becomes high, the amino group-containing monomer is preferably a methacrylate ester or a methacrylamide.

The carboxylic acid group-containing monomer may be used as a monomer. Examples of the carboxylic acid group-containing monomer include acrylic acid, methacrylic acid, crotonic acid, cinnamic acid, maleic acid, maleic anhydride, fumaric acid, itaconic acid, itaconic acid anhydride and tetraconic acid. Since the water- and oil-repellency is high, the carboxylic acid group-containing monomer is preferably used (Particularly, when a substrate to be treated is a textile comprising cotton).

(f) Other Monomer

Other monomer (f) other than the monomers (a)-(e), for example, a fluorine-free non-crosslinkable monomer, may be used. Examples of the other monomer include ethylene, vinyl acetate, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, and vinyl alkyl ether. Other monomer is not limited to these examples.

Other monomer may be a halogenated olefin (preferably free from a fluorine atom).

Preferably, the halogenated olefin is an olefin having 2-20 carbon atoms substituted by 1-10 chlorine atoms, bromine atoms or iodine atoms. Preferably, the halogenated olefin is a chlorinated olefin having 2-20 carbon atoms, particularly, an olefin having 2-5 carbon atoms and 1-5 chlorine atoms. Preferable examples of the halogenated olefin are a vinyl halide such as vinyl chloride, vinyl bromide and vinyl iodide; and vinylidene halide such as vinylidene chloride, vinylidene bromide and vinylidene iodide. Preferably, in the present invention, the halogenated olefin is not used, because the polymer may adhere to a roll (a gum-up property might be worsen).

The other monomer may be a fluorine-free crosslinkable monomer. The fluorine-free crosslinkable monomer is a monomer free from a fluorine atom. The fluorine-free crosslinkable monomer may be a compound which has at least two reactive groups and/or olefinic carbon-carbon double bonds (preferably a (meth)acrylate group), and which does not contain fluoride. The fluorine-free crosslinkable monomer may be a compound which has at least two olefinic carbon-carbon double bonds (preferably a (meth)acrylate group), or a compound which has at least one olefinic carbon-carbon double bond and at least one reactive group. Examples of the reactive group include a hydroxyl group, an epoxy group, a chloromethyl group, a blocked isocyanate group, an amino group and a carboxyl group.

The fluorine-free crosslinkable monomer may be a mono (meth)acrylate, di(meth)acrylate or mono(meth)acrylamide having a reactive group. Alternatively, the fluorine-free crosslinkable monomer may be di(meth)acrylate. One example of the fluorine-free crosslinkable monomer is a vinyl monomer having a hydroxyl group.

Examples of the fluorine-free crosslinkable monomer include diacetone (meth)acrylamide, N-methylol (meth)acrylamide, hydroxymethyl (meth)acrylate, hydroxyethyl (meth)acrylate, 3-chloro-2-hydroxypropyl (meth)acrylate, 2-acetoacetoxyethyl (meth)acrylate, butadiene, isoprene, chloroprene, vinyl monochloroacetate, vinyl methacrylate, glycidyl (meth)acrylate, 1,6-hexanediol di(meth)acrylate, and neopentyl glycol di(meth)acrylate, but the fluorine-free crosslinkable monomer are not limited to these examples.

The presence of the fluorine-free crosslikable monomer can increase the washing durability given by the polymer.

Herein, the term "(meth)acrylate" means an acrylate or methacrylate, and the term "(meth)acrylamide" means an acrylamide or methacrylamide.

Each of the monomers (a)-(f) and the chain transfer agent (d) may be alone or a mixture of at least two.

In the fluorine-containing polymer,
based on 100 parts by weight of the fluorine-containing monomer (a), the amount of the cyclic hydrocarbon group-containing acrylate ester monomer (b) may be 1-1000 parts by weight, for example, 10-500 parts by weight, particularly 15-300 parts by weight, especially 20-100 parts by weight, the amount of the aliphatic hydrocarbon group-containing (meth) acrylate ester monomer (c) may be 1-1000 parts by weight, for example, 10-500 parts by weight, particularly 15-300 parts by weight, especially 20-100 parts by weight, the amount of the silicon-containing monomer and the silicon-containing chain transfer agent (d) (the total of the silicon-containing monomer and the silicon-containing chain transfer agent) may be 1-800 parts by weight, for example, 1-500 parts by weight, particularly 3-200 parts by weight, especially 5-100 parts by weight, and the amount of the amino group-containing monomer and the carboxylic acid group-containing monomer (e) may be 0-500 parts by weight, for example, 1-100 parts by weight, particularly 2-50 parts by weight, especially 3-30 parts by weight, and the amount of other monomers (f) may be 0-800 parts by weight, for example, 1-500 parts by weight, especially 5-200 parts by weight.

In the fluorine-containing polymer,
based on 100 parts by weight of the fluorine-containing monomer (a), the amount of the silicon-containing monomer (d) may be 0-700 parts by weight, for example, 1-400 parts by weight, particularly 3-100 parts by weight, especially 5-50 parts by weight, and the amount of the silicon-containing chain transfer agent (d) may be 0-700 parts by weight, for example, 1-400 parts by weight, particularly 3-100 parts by weight especially 5-50 parts by weight.

The number-average molecular weight (Mn) of the fluorine-containing polymer may be 1,000 to 1,000,000, for example, from 3,000 to 500,000, particularly from 5,000 to 200,000. The number-average molecular weight (Mn) of the fluorine-containing polymer can be generally measured by GPC (gel permeation chromatography).

In the present invention, a monomer is polymerized optionally in the presence of a chain transfer agent, to obtain the fluorine-containing composition comprising the fluorine-containing polymer dispersed or dissolved in the medium.

The monomer and the chain transfer agent which are used in the present invention are as follows:
Monomers (a)-(c) and the monomer (d),
Monomers (a)-(c) and the chain transfer agent (d), or
Monomers (a)-(c) and the monomer (d)+the chain transfer agent (d).

In addition to the above, one or both of the monomers (e) and (f) may be used.

The fluorine-containing polymer has the repeating units derived from the monomer (a)-(c), and optionally the repeating units derived from at least one of the monomers (d), (e) and (f). The fluorine-containing polymer of the present invention may consist of the repeating units derived from the monomer (a)-(c), and optionally the repeating units derived from the monomer (d).

The monomer (a) is used to mainly enhance the water- and oil-repellency, the monomer (b) is used to mainly enhance the water-repellency, the monomer (c) is used to mainly enhance the oil-repellency and the dilution stability, the monomer (d) is used to mainly enhance the water-repellency and the dilution stability, the chain transfer agent (d) is used to mainly enhance the water-repellency and the dilution stability, the monomer (e) is used to mainly enhance the water-repellency, and the monomer (f) is used to mainly enhance the water- and oil-repellency and the dilution stability.

Preferably, the monomer (a) is $F(CF_2)_6CH_2CH_2OCOC(Cl)=CH_2$, the monomer (b) is benzyl methacrylate, the monomer (c) is stearyl methacrylate and/or behenyl methacrylate, the monomer (d) is α-butyl-ω-(3-methacryloxypropyl) polydimethylsiloxane, the chain transfer agent (d) is aminomercapto-functional siloxane, and/or the monomer (e) is maleic anhydride and/or diethylamino ethyl methacrylate.

The fluorine-containing polymer of the present invention can be produced by any of conventional polymerization methods and the polymerization condition can be optionally selected. The polymerization method includes, for example, a solution polymerization, a suspension polymerization and an emulsion polymerization. A solution polymerization is preferred.

The method of obtaining the organic solvent solution of the fluorine-containing polymer is not limited. For example, after preparing the fluorine-containing polymer by emulsion polymerization in water, water is removed and an organic solvent is added to obtain the organic solvent solution of the fluorine-containing polymer.

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.1 to 10 parts by weight, based on 100 parts by weight of total of the monomers.

The organic solvent is inert to the monomer and dissolves the monomer. Examples of the organic solvent include an ester (for example, an ester having 2-30 carbon atoms, particularly, ethyl acetate and butyl acetate), a ketone (for example, a ketone having 2-30 carbon atoms, particularly, methyl ethyl ketone, diisobutyl ketone), an alcohol (for example, an alcohol having 1-30 carbon atoms, particularly, isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 10 to 2,000 parts by weight, for example, from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is preferable that the monomers are dispersed in water by using an emulsifying device capable of applying a strong shearing energy (e.g., a high-pressure homogenizer and an ultrasonic homogenizer) and then polymerized. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The anionic emulsifying agent and/or the cationic emulsifying agent and/or the nonionic emulsifying agent are preferable. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol, ethanol and N-methyl-2-pyrrolidone. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

A chain transfer agent (a chain transfer agent other than the silicon-containing compound) may be used in the polymerization. The molecular weight of the fluorine-containing polymer can be changed according to the amount of the chain transfer agent used. Examples of the chain transfer agent include a mercaptan group-containing compound (particularly alkyl mercaptan (for example, having 1-30 carbon atoms)), such as lauryl mercaptan, thioglycol, and thioglycerol, and a mineral salt such as sodium hypophosphite and sodium hydrogensulfite. The amount of the chain transfer agent may be within the range from 0.01 to 10 parts by weight, for example, from 0.1 to 5 parts by weight, based on 100 parts by weight of total of the monomers.

The fluorine-containing composition of the present invention is preferably in the form of a solution, an emulsion (particularly an aqueous dispersion) or an aerosol. The fluorine-containing composition generally comprises the fluorine-containing polymer (active ingredient of the surface treatment agent) and a medium (particularly a liquid medium, for example, an organic solvent and/or water). The amount of the medium may be, for example, from 5 to 99.9% by weight, particularly 10 to 80% by weight, based on the fluorine-containing composition.

The concentration of the fluorine-containing polymer may be from 0.01 to 95% by weight, for example, 5 to 50% by weight, based on the fluorine-containing composition.

The fluorine-containing composition of the present invention can be applied to a substrate to be treated by a known procedure. Usually, the fluorine-containing composition is diluted with an organic solvent or water, is adhered to surfaces of the substrate by a well-known procedure such as an immersion coating, a spray coating and a foam coating, and is dried. If necessary, the treatment liquid is applied together with a suitable crosslinking agent, followed by curing. It is also possible to add mothproofing agents, softeners, antimicrobial agents, flame retardants, antistatic agents, paint fixing agents, crease-proofing agents, etc. to the fluorine-containing composition. The concentration of the fluorine-containing polymer in the treatment liquid contacted with the substrate may be from 0.01 to 10% by weight (particularly for immersion coating), for example, from 0.05 to 10% by weight, based on the treatment liquid.

The substrate to be treated with the fluorine-containing composition (for example, a water- and oil-repellent agent) of the present invention include a textile, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers.

The textile may be in any form such as a fiber and a fabric.

The fluorine-containing composition of the present invention can be used also as an internal mold release agent or an external mold release agent.

The fluorine-containing polymer can be applied to fibrous substrates (such as textiles) by any known method to treat textiles in liquid. When the textile is a fabric, the fabric may be immersed in the solution or the solution may be adhered or sprayed to the fabric. The treated textiles are dried, preferably heated at a temperature between 100° C. and 200° C. in order to develop the oil repellency.

Alternatively, the fluorine-containing polymer can be applied to a textile via a cleaning process, such as in a laundry application or dry cleaning process.

The textile which is treated is typically a fabric, including woven, knitted and nonwoven fabrics, fabrics in garment form and carpet, but may also be a fibre or yarn or intermediate textile product such as a sliver or roving. The textile material can be a natural fibre such as cotton or wool, a manmade fibre such as viscose rayon or lyocell or a synthetic fibre such as polyester, polyamide or acrylic fibre, or can be a mixture of fibres such as a mixture of natural and synthetic fibres. The polymeric product of the invention is particularly effective in rendering cellulosic fibres such as cotton or rayon oleophobic and oil repellent. The method of the invention generally also renders the textile hydrophobic and water repellent.

The fibrous substrate can alternatively be leather. The polymeric product can be applied to leather from aqueous solution or emulsion at various stages of leather processing, for example during leather wet end processing or during leather finishing, to render the leather hydrophobic and oleophobic.

Alternatively, the fibrous substrate can be paper. The polymeric product can be applied to preformed paper or at various stages of papermaking, for example during drying of the paper.

The term "treatment" means that the treatment agent is applied to the substrate by immersion, spray, coating or the like. The treatment gives the result that a fluorine-containing polymer which is an active component of the treatment agent is penetrated into internal parts of the substrate and/or adhered to surfaces of the substrate.

The treatment agent (treatment agent composition) of the present invention may be a dispersion liquid. But, the treatment agent composition is preferably a solution wherein the fluorine-containing polymer is dissolved in the solvent (particularly the organic solvent). Preferably, the solvent is an organic solvent (one organic solvent or a mixture of two or more organic solvents), particularly an organic solvent having a flash point of 0-200° C. (particularly at least 21° C., less than 70° C.) especially in 1 atmosphere. Preferably, the treatment agent composition is a solution in an organic solvent having a flash point of at least 21° C. The organic solvent is preferably a petroleum organic solvent and/or a hydrocarbon organic solvent, more preferably a petroleum hydrocarbon and/or an aliphatic hydrocarbon. Alternatively, the organic solvent is preferably an ester (for example, an ester having 2-30 carbon atoms, e.g., ethyl acetate and butyl acetate), a ketone (for example, a ketone having 2-30 carbon atoms, e.g., methyl ethyl ketone and diisobutyl ketone), and an alcohol (for example, an alcohol having 1-30 carbon atoms, e.g., isopropyl alcohol). The petroleum organic solvents may be Pegasol 3040 and Exxsol D40 (both manufactured by Exxon Mobil), Newsol DX Highsoft (manufactured by a JX Nippon Oil & Energy) and New Brightsol (manufactured by Shell Chemicals).

The treatment agent of the present invention can be used conveniently for textiles (particularly for cleaning), and masonry, and gives high water- and oil-repellency.

EXAMPLES

The followings are examples which specifically explain the present invention. These examples do not limit the present invention:

In the following Examples, parts, % or ratio are parts by weight, % by weight or weight ratio, unless otherwise specified.

The procedures of the tests were performed in the following manner.

Dilution Stability Test

The properties were measured as follows:

When the fluorine-containing copolymer cannot be dispersed in the solvent dispersion liquid so that the precipitation, separation, etc. of the fluorine-containing copolymer are visually observed, the evaluation is "Bad". In the cases except that the dispersion is "Bad", the evaluation is "Good".

Shower Water Repellency Test

Shower water repellency test is conducted according to JIS-L-1092. The shower water repellency is expressed by water repellency No. (as shown in the below-mentioned Table 1).

A glass funnel having a volume of at least 250 ml and a spray nozzle which can spray 250 ml of water for 25-30 seconds are used. A flame for fixing a test fabric is a metal flame having a diameter of 15 cm. Three test fabrics each having a size of about 20 cm×20 cm are prepared and the test fabric is mounted on the flame so that the test fabric has no wrinkle. The center of the spray is located on the center of the test fabric. Water of room temperature (250 mL) is charged into the glass funnel and sprayed on the test fabric (for time of 25-30 seconds). The flame is removed from a stand, the flame is lightly hit at a laboratory desk to drop excess water droplets in the state that one edge of the flame is held and a sprayed surface is downside. Then, the flame is rotated at an angle of 180 degrees and the same procedure is repeated, the test fabric surface is observed and evaluated according to water-repellent No. of Table 1. The evaluation results are obtained from an average of three measurements.

When the evaluation result is 90 or more, the water repellency is "Good". In the case of 80, the water repellency is "Fair". In the case 70 or less, the water repellency is "Bad".

TABLE 1

| Final evaluation | Water repellency No. | State |
| --- | --- | --- |
| Good | 100 | No wet or adhesion on surface |
|  | 90 | Slight wet and adhesion on surface |
| Fair | 80 | Partially wet on surface |
| Bad | 70 | Wet on surface |
|  | 50 | Wet on whole surface |
|  | 0 | Wet on front and back whole surfaces |

Oil-repellency Test

Oil repellency are measured according to AATCC-TM118, wherein several drops of test solution shown in the following Table 2 are dropped on two potions of the test fabric, and the penetration state is observed after 30 seconds. An oil-repellent highest point given by the test solution which does not show penetration is taken as the oil repellency.

When the evaluation result was 4 or more, the oil repellency is "Good". In the case of 2 or 3, the evaluation is "Fair". In the case 1 or less, the evaluation is "Bad".

TABLE 2

| Final evaluation | Water repellency | Test liquid | Surface tension (dyne/cm, 25° C.) |
| --- | --- | --- | --- |
| Good | 8 | n-Heptane | 20.0 |
|  | 7 | n-Octane | 21.8 |
|  | 6 | n-Decane | 23.5 |
|  | 5 | n-Dodecane | 25.0 |
|  | 4 | n-Tetradecane | 26.7 |
| Fair | 3 | n-Hexadecane | 27.3 |
|  | 2 | Mixture liquid of n-Hexadecane 35/nujol 65 | 29.6 |
| Bad | 1 | Nujol | 31.2 |
|  | Fail | Inferior to 1 | — |

Measurement of Weight-average Molecular Weight

The weight-average molecular weight of the fluorine-containing polymer is measured by GPC (gel permeation chromatography) (in terms of polystyrene).

In the gel permeation chromatography, Shodex GPC-104 (manufactured by SHOWA DENKO K. K.) was used. 2 Columns of Shodex LF-604, 2 columns of Shodex KF-601 and 2 columns of Shodex KF-600RH and 2 columns of Shodex KF-600RL, which are connected, are used as columns. UV (Shodex UV-41, 254 nm) detector is used as a detector. Standard polystyrene (Shodex STANDARD S series) is used as a standard substance.

The analysis sample is that the fluorine-containing copolymer is dissolved in tetrahydrofuran to give a 0.5% by weight solution, which is passed through a 0.5 μm filter. When measuring the weight-average molecular weight, the column is held at 40° C., a flow rate is set to be 0.6 mL/minute, tetrahydrofuran is used as an eluate, and 50 μL of an analysis sample is injected.

Synthesis Example 1

233 parts by weight of butyl acetate as a solvent was introduced into a 1 L reaction vessel equipped with a stirrer, a thermometer, a refluxing condenser, a dropping funnel, a nitrogen gas inlet and a heater. Then, with stirring, a monomer (totally 100 parts of monomer) consisting of 54 parts of $F(CF_2)_6CH_2CH_2OCOC(Cl)\!=\!CH_2$ (hereinafter referred to as "C6SFCIA"), 22 parts of benzyl methacrylate (BzMA), 12 parts of stearyl methacrylate (StMA), 2 parts of maleic anhydride (MA) and 10 parts of α-butyl-ω-(3-methacryloxypropyl)polydimethylsiloxane, and tert-butyl perpivalate as an initiator (3 parts) were added in this order to obtain a mixture, which was further stirred for 12 hours under the nitrogen atmosphere at 60° C. to complete the copolymerization. Then, 50 parts of butyl acetate and 283 parts of Pegasol 3040 (manufactured by Exxon Mobil) were added in this order, after stirring for 1 hour, this reaction mixture was cooled to a room temperature to obtain a fluorine-containing copolymer solution (S1). The solid concentration of this solution was 15% by weight. The monomer composition of the fluorine-containing copolymer was almost the same as the formulations of charged monomers. The weight-average molecular weight of the fluorine-containing copolymer was 28,000.

Synthesis Example 2

The copolymerization and post-processing were conducted as in Synthesis Example 1 except that a monomer (totally 100 parts of monomer) consisting of a monomer (totally 100 parts of monomer) consisting of 55 parts of $F(CF_2)_6CH_2CH_2OCOC(Cl)\!=\!CH_2$ (C6SFCIA), 23 parts of benzyl methacrylate (BzMA), 12 parts of stearyl methacrylate (StMA) and 10 parts of an aminomercapto-functional siloxane, and tert-butyl perpivalate (3 parts) as an initiator in this order were added, to obtain a fluorine-containing copolymer solution (S2). The monomer composition of the fluorine-containing copolymer was almost the same as the formulations of charged monomers.

The aminomercapto-functional siloxane used in the Synthesis Examples (this Synthesis Example and other Synthesis Examples) was:

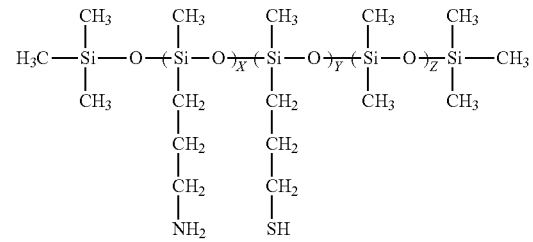

wherein X, Y and Z (average) are 2, 14 and 100, respectively.

Synthesis Example 3

The copolymerization and post-processing were conducted as in Synthesis Example 1 except that a monomer (totally 100 parts of monomer) consisting of 50 parts of $F(CF_2)_6CH_2CH_2OCOC(Cl)\!=\!CH_2$ (C6SFCIA), 23 parts of cyclohexyl methacrylate (CHMA), 12 parts of stearyl methacrylate (StMA) and 15 parts of an aminomercapto-functional siloxane, and tert-butyl perpivalate (3 parts) as an initiator in this order were added, to obtain a fluorine-containing copolymer solution (S3). The monomer composition of the fluorine-containing copolymer was almost the same as the formulations of charged monomers.

Synthesis Example 4

The copolymerization and post-processing were conducted as in Synthesis Example 1 except that a monomer (totally 100 parts of monomer) consisting of a monomer (totally 100 parts of monomer) consisting of 55 parts of $F(CF_2)_6CH_2CH_2OCOC(CH_3)=CH_2$ (C6SFMA), 25 parts of isobornyl methacrylate (IBMA), 15 parts of stearyl methacrylate (StMA) and 5 parts of an aminomercapto-functional siloxane, and tert-butyl perpivalate (3 parts) as an initiator in this order were added, to obtain a fluorine-containing copolymer solution (S4). The monomer composition of the fluorine-containing copolymer was almost the same as the formulations of charged monomers.

Synthesis Example 5

The copolymerization and post-processing were conducted as in Synthesis Example 1 except that a monomer (totally 100 parts of monomer) consisting of a monomer (totally 100 parts of monomer) consisting of 54 parts of $F(CF_2)_6CH_2CH_2OCOC(Cl)=CH_2$ (C6SFCIA), 22 parts of benzyl methacrylate (BzMA), 9 parts of lauryl methacrylate (LMA), 2 parts of maleic anhydride (MA) and 13 parts of α-butyl-ω-(3-methacryloxypropyl)polydimethylsiloxane, and tert-butyl perpivalate (3 parts) as an initiator in this order were added, to obtain a fluorine-containing copolymer solution (S5). The monomer composition of the fluorine-containing copolymer was almost the same as the formulations of charged monomers.

Synthesis Example 6

The copolymerization and post-processing were conducted as in Synthesis Example 1 except that a monomer (totally 100 parts of monomer) consisting of a monomer (totally 100 parts of monomer) consisting of 54 parts of $F(CF_2)_6CH_2CH_2OCOC(Cl)=CH_2$ (C6SFCIA), 22 parts of benzyl methacrylate (BzMA), 12 parts of behenyl methacrylate (BeMA), 2 parts of maleic anhydride (MA) and 10 parts of α-butyl-ω-(3-methacryloxypropyl)polydimethylsiloxane, and tert-butyl perpivalate (3 parts) as an initiator in this order were added, to obtain a fluorine-containing copolymer solution (S6). The monomer composition of the fluorine-containing copolymer was almost the same as the formulations of charged monomers.

Synthesis Example 7

The copolymerization and post-processing were conducted as in Synthesis Example 1 except that a monomer (totally 100 parts of monomer) consisting of a monomer (totally 100 parts of monomer) consisting of 54 parts of $F(CF_2)_6CH_2CH_2OCOC(Cl)=CH_2$ (C6SFCIA), 22 parts of benzyl methacrylate (BzMA), 12 parts of stearyl methacrylate (StMA), 2 parts of diethylaminoethyl methacrylate (DEAEMA) and 10 parts of α-butyl-ω-(3-methacryloxypropyl)polydimethylsiloxane, and tert-butyl perpivalate (3 parts) as an initiator in this order were added, to obtain a fluorine-containing copolymer solution (S7). The monomer composition of the fluorine-containing copolymer was almost the same as the formulations of charged monomers.

Synthesis Example 8

The procedure of Synthesis Example 1 was repeated except that 333 parts of butyl acetate was added instead of 50 parts of butyl acetate and 283 parts of Pegasol 3040 (manufactured by Exxon Mobil), to obtain a fluorine-containing copolymer solution (S8). The monomer composition of the fluorine-containing copolymer was almost the same as the formulations of charged monomers.

Synthesis Example 9

233 parts by weight of methyl ethyl ketone (MEK) as a solvent was charged into a 1 L reaction vessel equipped with a stirrer, a thermometer, a refluxing condenser, a dropping funnel, a nitrogen gas inlet and a heater. Then, with stirring, a monomer (totally 100 parts of monomer) consisting of 60 parts of $F(CF_2)_6CH_2CH_2OCOC(Cl)=CH_2$ (hereinafter referred to as "C6SFCIA") and 40 parts of stearyl methacrylate (StMA), and tert-butyl perpivalate as an initiator (3 parts) were added in this order to obtain a mixture, which was further stirred for 12 hours under the nitrogen atmosphere at 60° C. to complete the copolymerization. Then, 50 parts of butyl acetate and 283 parts of Pegasol 3040 (manufactured by Exxon Mobil) were added in this order, after stirring for 1 hour, this reaction mixture was cooled to a room temperature to obtain a fluorine-containing copolymer solution (R1). The solid concentration of this solution was 15% by weight. The monomer composition of the fluorine-containing copolymer was almost the same as the formulations of charged monomers. The weight-average molecular weight of the fluorine-containing copolymer was 33,000.

Synthesis Example 10

The copolymerization and post-processing were conducted as in Synthesis Example 9 except that a monomer (totally 100 parts of monomer) consisting of a monomer (totally 100 parts of monomer) consisting of 60 parts of $F(CF_2)_6CH_2CH_2OCOC(CH_3)=CH_2$ (C6SFMA) and 25 parts of isobornyl methacrylate (IBMA) and 15 parts of stearyl methacrylate (StMA), and tert-butyl perpivalate (3 parts) as an initiator in this order were added, to obtain a fluorine-containing copolymer solution (R2). The monomer composition of the fluorine-containing copolymer was almost the same as the formulations of charged monomers.

Synthesis Example 11

The copolymerization and post-processing were conducted as in Synthesis Example 9 except that a monomer (totally 100 parts of monomer) consisting of a monomer (totally 100 parts of monomer) consisting of 60 parts of $F(CF_2)_6CH_2CH_2OCOC(Cl)=CH_2$ (C6SFCIA), 30 parts of stearyl methacrylate (StMA) and 10 parts of α-butyl-ω-(3-methacryloxypropyl)polydimethylsiloxane, and tert-butyl perpivalate (3 parts) as an initiator in this order were added, to obtain a fluorine-containing copolymer solution (R3). The monomer composition of the fluorine-containing copolymer was almost the same as the formulations of charged monomers.

Synthesis Example 12

The copolymerization and post-processing were conducted as in Synthesis Example 9 except that a monomer (totally 100 parts of monomer) consisting of a monomer (totally 100 parts of monomer) consisting of 55 parts of $F(CF_2)_6CH_2CH_2OCOC(Cl)=CH_2$ (C6SFCIA), 23 parts of cyclohexyl methacrylate (CHMA), 12 parts of methyl methacrylate (MMA) and 10 parts of α-butyl-ω-(3-methacryloxypropyl)polydimethylsiloxane, and tert-butyl perpivalate (3 parts) as an initiator in this order were added, to obtain a fluorine-containing copolymer solution (R4). The monomer composition of the fluorine-containing copolymer was almost the same as the formulations of charged monomers.

Preparation Example 1

Pegasol 3040 (276 g) was added for dilution to 24 g of the fluorine-containing copolymer solution (S1) obtained in Synthesis Example 1 to obtain a solvent dispersion (SD1) having a solid content of 1.2% by weight.

Preparation Examples 2 to 8

Using the fluorine-containing copolymer solutions (S2-S8) obtained in Synthesis Examples 2 to 8, the same procedure as in Preparation Example 1 was conducted, to give solvent dispersions (SD2-SD8) having a solid content of 1.2% by weight.

Comparative Preparation Example 1

Using the fluorine-containing copolymer solution (R1) obtained in Synthesis Example 9, the same procedure as in Preparation Example 1 was conducted, to give a solvent dispersions (RD1) having a solid content of 1.2% by weight.

Comparative Preparation Examples 2 to 4

Using the fluorine-containing copolymer solution (R2-R4) obtained in Synthesis Examples 10 to 12, the same procedure as in Preparation Example 1 was conducted, to give a solvent dispersions (RD2-RD4) having a solid content of 1.2% by weight.

Example 1

Test fabrics were produced by using the solvent dispersion liquids obtained in Preparation Examples 1-8 (Synthesis Examples 1-8), and Comparative Preparation Examples 1-4 (Synthesis Examples 9-12), and then water repellency and oil repellency were evaluated.

After charging a polyester fabric or a cotton fabric into a plastic bottle containing 300 g of the solvent dispersion liquid (SD1) and sealing the bottle, the bottle was shaken up and down for 10 seconds so that the fabric was sufficiently immersed in the solvent dispersion liquid. The fabric was removed from the bottle and the fabric was processed at 1,000 rpm for 1 minute by using a centrifugal dehydrator to eliminate the excessive solvent. Then, the fabric was dried in a draft chamber at room temperature for 24 hours to prepare a test fabric. The water-repellency test and the oil-repellency test of this test fabric were conducted. The evaluation results of performances are shown in Table 3.

Examples 2 to 8

The same procedures as in Example 1 were conducted except that each of the solvent dispersions (SD2-SD8) of fluorine-containing copolymer prepared in Preparation Examples 2-8 was used instead of the solvent dispersion (SD1) of fluorine-containing copolymer in Example 1. The evaluation results of performances of the test fabrics are shown in Table 3.

Comparative Examples 1 to 4

The same procedures as in Example 1 were conducted except that the solvent dispersions (RD1-RD4) of fluorine-containing copolymer were used instead of the solvent dispersion (SD1) of fluorine-containing copolymer in Example 1. The evaluation results of performances of the test fabrics are shown in Table 3.

TABLE 3

| Fluorine-containing copolymer solvent dispersion liquid | | | Ex. | Ex. 2 | Ex. 3 | Ex. 4 | Ex. 5 | Ex. 6 | Ex. 7 | Ex. 8 | Com. Ex. 1 | Com. Ex. 2 | Com. Ex. 3 | Com. Ex. 4 |
|---|---|---|---|---|---|---|---|---|---|---|---|---|---|---|
| Monomer Ingredients (part) | C6SFCIA | | 54 | 55 | 50 | | 54 | 54 | 54 | 54 | 60 | | 60 | 55 |
| | C6SFMA | | | | | 55 | | | | | | 60 | | |
| | CHMA | | | | 23 | | | | | | | | | 23 |
| | BzMA | | 22 | 23 | | | 22 | 22 | 22 | 22 | | | | |
| | IBMA | | | | | 25 | | | | | | 25 | | |
| | MMA | | | | | | | | | | | | | 12 |
| | LMA | | | | | | 9 | | | | | | | |
| | StMA | | 12 | 12 | 12 | 15 | | | 12 | 12 | 40 | 15 | 30 | |
| | BeMA | | | | | | | 12 | | | | | | |
| | DEAEMA | | | | | | | | | 2 | | | | |
| | MA | | 2 | | | | 2 | 2 | | 2 | | | | |
| | Aminomercapto-functional siloxane | | | 10 | 15 | 5 | | | | | | | | |
| | α-Butyl-ω-(3-methacryloxypropyl) polydimethylsiloxane | | 10 | | | | 13 | 10 | 10 | 10 | | | 10 | 10 |
| Initiator (part) | Perbutyl PV | | 3 | 3 | 3 | 3 | 3 | 3 | 3 | 3 | 3 | 3 | 3 | 3 |
| Polymerization solvent (part) | Butyl acetate | | 233 | 233 | 233 | 233 | 233 | 233 | 233 | 233 | 233 | 233 | 233 | 233 |
| Diluent solvent (part) | Butyl acetate | | 50 | 50 | 50 | 50 | 50 | 50 | 50 | 333 | 50 | 50 | 50 | 50 |
| | Pegasol 3040 | | 283 | 283 | 283 | 283 | 283 | 283 | 283 | 0 | 283 | 283 | 283 | 283 |
| Dilution stability | | | Good | Good | Good | Good | Good | Good | Good | Good | Good | Fair | Good | Bad |
| Performance evaluation | Water-repellency | Polyester fabric | Good | Good | Good | Good | Good | Good | Good | Good | Bad | Fair | Bad | Fair |
| | | Cotton fabric | Good | Good | Good | Fair | Good | Good | Good | Good | Bad | Bad | Bad | Bad |
| | Oil repellency | Polyester fabric | Good | Good | Good | Fair | Fair | Good | Good | Good | Good | Fair | Good | Fair |
| | | Cotton fabric | Good | Good | Fair | Fair | Fair | Good | Good | Good | Fair | Fair | Fair | Fair |

INDUSTRIAL APPLICABILITY

The treatment agent of the present invention can be appropriately used for substrates, such as textiles (particularly for cleaning) and masonry, and can impart the excellent water and oil repellency to the substrates.

The invention claimed is:

1. A fluorine-containing polymer comprising:
   (a) repeating units derived from a fluorine-containing monomer represented by the formula:

$$CH_2=C(-X)-C(=O)-Y-Z-Rf$$

wherein X is a hydrogen atom, a monovalent organic group or a halogen atom,
   Y is —O— or —NH—,
   Z is a direct bond or an divalent organic group, and
   Rf is a fluoroalkyl group having 1 to 20 carbon atoms,
   (b) repeating units derived from a cyclic hydrocarbon group-containing acrylate ester monomer represented by the formula:

$$CH_2=CQ^{11}-C(=O)-O-Q^{12}$$

wherein $Q^{11}$ is a hydrogen atom, a monovalent organic group or a halogen atom, and
   $Q^{12}$ is a cyclic hydrocarbon-containing group having 4 to 30 carbon atoms,
   (c) repeating units derived from an aliphatic hydrocarbon group-containing acrylate ester monomer represented by the formula:

$$CH_2=CQ^{21}-C(=O)-O-Q^{22}$$

wherein $Q^{21}$ is a hydrogen atom, a monovalent organic group or a halogen atom, and
   $Q^{22}$ is a linear or branched aliphatic hydrocarbon group having 12 to 30 carbon atoms, and
   (d) repeating units derived from a carboxylic acid group-containing monomer which is at least one selected from the group consisting of acrylic acid, methacrylic acid, crotonic acid, cinnamic acid, maleic acid, maleic anhydride, fumaric acid, itaconic acid, itaconic anhydride and tetraconic acid,
   wherein the fluorine-containing polymer is produced by polymerization in the presence of:
   (e) one or both of a silicon-containing monomer or a silicon-containing chain transfer agent.

2. The fluorine-containing composition according to claim 1, wherein the fluorine-containing monomer (a) is represented by the formula:

$$CH_2=C(-X)-C(=O)-Y-Z-Rf \quad (1)$$

wherein X is a linear or branched alkyl group having 2-21 carbon atoms, a fluorine atom, a chlorine atom, a bromine atom, an iodine atom, a $CFX^1X^2$ group (where $X^1$ and $X^2$ are a hydrogen atom, a fluorine atom, a chlorine atom, a bromine atom or an iodine atom), a cyano group, a linear or branched fluoroalkyl group having 1-21 carbon atoms, a substituted or unsubstituted benzyl group, or a substituted or unsubstituted phenyl group;
   Y is —O— or —NH—;
   Z is an aliphatic group having 1-10 carbon atoms, an aromatic group or cycloaliphatic group having 6-18 carbon atoms,
   a —$CH_2CH_2N(R^1)SO_2$— group (where $R^1$ is an alkyl group having 1-4 carbon atoms),
   a —$CH_2CH(OZ^1)CH_2$— group (where $Z^1$ is a hydrogen atom or an acetyl group),
   a —$(CH_2)_m$—$SO_2$—$(CH_2)_n$— group or a —$(CH_2)_m$—S—$(CH_2)_n$— group (where m is 1-10 and n is 0-10),
   Rf is a linear or branched fluoroalkyl group having 1 to 6 carbon atoms.

3. The fluorine-containing polymer according to claim 1, wherein in the fluorine-containing monomer (a), X is a chlorine atom.

4. The fluorine-containing polymer according to claim 1, wherein in the fluorine-containing monomer (a), the carbon number of Rf is 6.

5. The fluorine-containing polymer according to claim 1, wherein the monomers (b) and (c) are a methacrylate ester where $Q^{11}$ and $Q^{21}$ are a methyl group.

6. A surface treatment agent composition comprising:
   (1) the fluorine-containing polymer according to claims 1, and
   (2) an organic solvent.

7. The surface treatment agent composition according to claim 6, which is a water- and oil-repellent agent or a stain proofing agent.

8. The surface treatment agent composition according to claim 6, wherein the surface treatment agent composition is a solution having a flash point of at least 21° C.

9. The surface treatment agent composition according to claim 6, wherein the organic solvent is a hydrocarbon organic solvent.

10. A method of treating a substrate with the surface treatment agent composition according to claim 6.

11. A substrate which is treated with the surface treatment agent composition according to claim 6.

* * * * *